US006954228B1

(12) United States Patent
Acharya et al.

(10) Patent No.: US 6,954,228 B1
(45) Date of Patent: Oct. 11, 2005

(54) IMAGE PROCESSING METHODS AND APPARATUS

(75) Inventors: Tinku Acharya, Chandler, AZ (US);
Yap-Peng Tan, Chandler, AZ (US);
Ping-Sing Tsai, Gilbert, AZ (US);
Werner Metz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 09/359,523

(22) Filed: Jul. 23, 1999

(51) Int. Cl.$^7$ .......................... H04N 5/228; H04N 9/73
(52) U.S. Cl. .................... 348/223; 348/222.1; 358/516
(58) Field of Search .................. 348/223.1, 222.1; 358/512, 518, 520, 516, 523, 525; 345/593, 345/549

(56) References Cited

U.S. PATENT DOCUMENTS

| 4,335,397 | A | * | 6/1982 | Tamura | 348/207.99 |
|---|---|---|---|---|---|
| 5,202,756 | A | * | 4/1993 | Sasaki et al. | 348/223.1 |
| 6,148,031 | A | * | 11/2000 | Kato | 375/240.13 |
| 6,201,530 | B1 | * | 3/2001 | Thadani et al. | 345/593 |
| 6,421,083 | B1 | * | 7/2002 | Takakura | 348/223.1 |

* cited by examiner

*Primary Examiner*—James J. Groody
(74) *Attorney, Agent, or Firm*—Trop, Pruner & Hu, P.C.

(57) ABSTRACT

A method includes capturing an optical image to form raw data indicative of the optical image and using a look-up table to transform the raw data into transformed data that indicates a second image. A white color balance of the second image is computed, and the values in the look-up table are modified based on the computed white color balance.

18 Claims, 4 Drawing Sheets

IMAGE PROCESSING METHODS AND APPARATUS

BACKGROUND

The invention relates to an image processing method and apparatus.

Referring to FIG. 1, a typical computer system 5 may include a digital camera 12 that electrically captures an optical image 13 and a computer 10 that may store, print or display the captured image. To capture the image, the camera 12 typically includes an image sensor 11 that captures digitized portions of the image (called pixels) and communicates indications (digital bits, for example) of these pixels to the computer 10 (via a serial bus 14, for example).

The image sensor 11 typically does not respond to light frequencies in the same manner as the human eye. As a result, raw data that is provided by the image sensor 11 may need to be transformed so that the transformed data indicates the optical image 13 as perceived by the human eye. However, before this transformation occurs, the raw data may need to be manipulated to compensate for other effects introduced by the camera 12, such as stray lighting effects, lens flare effects and the nonlinearity of the image sensor 11. Also, the raw data may be manipulated to adjust a white color balance in the image that is indicated by the data.

The term "white color balance" refers to a measure of the balance of colors in the captured image. For example, when an image is captured under a florescent light, the raw data from the image sensor 11 may indicate a generally green image. To correct an incorrect white color balance, the computer 10 may scale the pixel intensities (that are indicated by the raw data from the image sensor 11). For example, the computer 10 may scale the pixel intensities that indicate red, green and blue color components of the optical image 13 by different factors (called $\alpha_R$, $\alpha_G$, and $\alpha_B$, respectively) to compensate for an white color imbalance.

Unfortunately, an image processing circuit, such as the above-described camera 12, may be specifically designed for a given image sensor and other components of the camera 12. Thus, there is a continuing need for an imaging processing circuit that more readily accommodates different camera components, such as image sensors that have different sizes and types, for example.

SUMMARY

In one embodiment, a method includes capturing an optical image to form raw data indicative of the optical image and using values in a look-up table to transform the raw data into transformed data that indicates a second image. A white color balance of the second image is computed, and the values in the look-up table are modified based on the computed white color balance.

DETAILED DESCRIPTION

Figure 1:
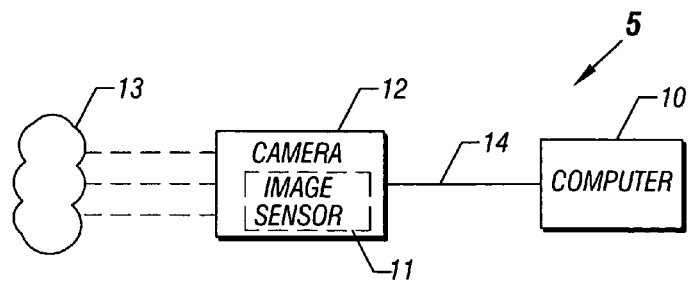
FIG. 1 is a schematic diagram of a computer system of the prior art.
Figure 2:
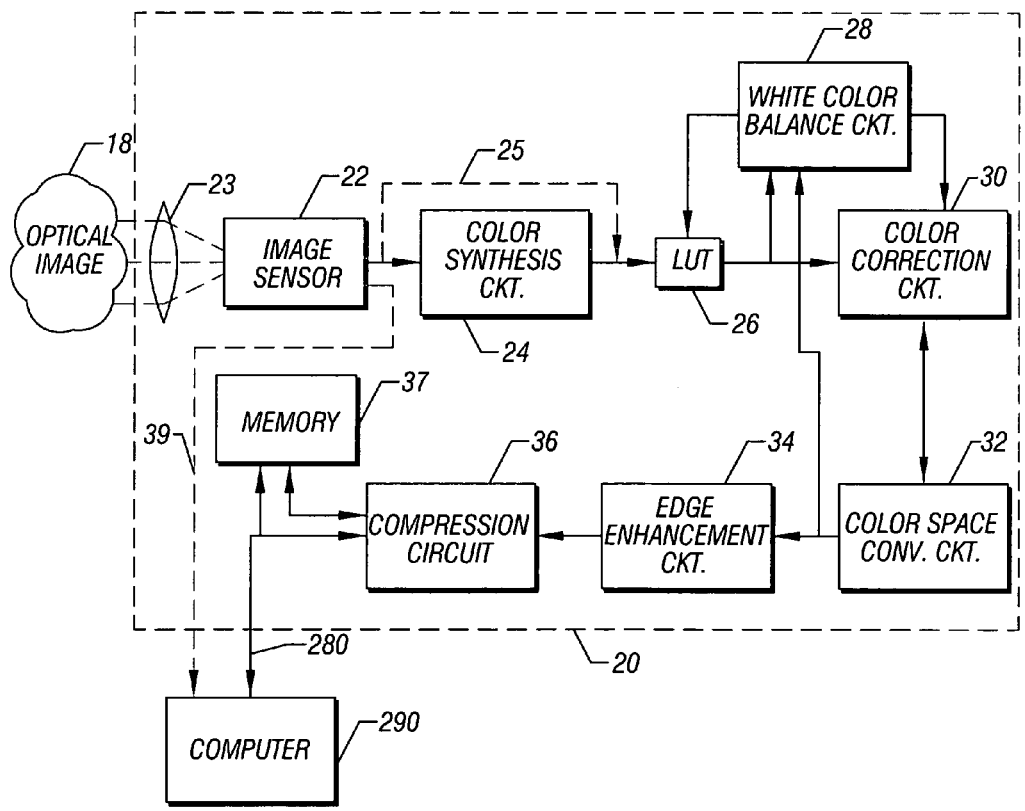
FIG. 2 is a schematic diagram of a camera according to an embodiment of the invention.
Figure 3:
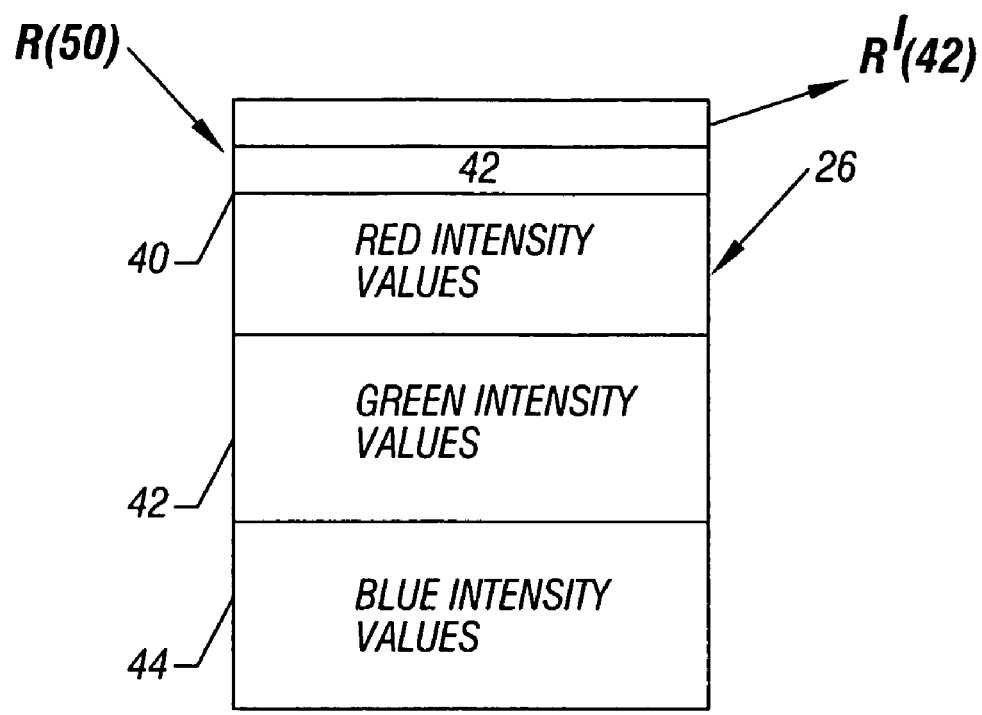
FIG. 3 is an illustration of a look-up table of the camera of FIG. 2 according to an embodiment of the invention.

Referring to FIG. 2, an embodiment 20 of a digital camera in accordance with the invention includes a look-up table 26 that is used by the camera 20 to modify raw pixel data (that is provided by an image sensor 22) to compensate for such factors as the white balance of a captured image, nonlinearities introduced by the image sensor 22, and flare effects introduced by a lens 23. In this manner, the look-up table 26 stores values to which the different pixel intensities and colors that are indicated by the raw pixel data are linearly mapped. This mapping, in turn, may compensate for one or more of the factors described above. More particularly, the table 26 may store intensity values in an array of storage locations, and each storage location may be uniquely addressed by a color component (a red, green or blue color component, for example) and the intensity of that color component. For example, for a red-green-blue (RGB) color space, the captured red, green and blue color pixels may be associated with three different groups 40, 42 and 44 respectively, (see FIG. 3), of pixel intensity values in the look-up table 26. As an example, a red pixel (depicted as R(50) in FIG. 3) that has an intensity of fifty may map into a location of the table 26 that stores an intensity of 42 to produce a transformed red pixel intensity value (called R'(42) in FIG. 3) of 42.

Instead of establishing the values of the table 26 in view of specific image sensor, lens and/or lighting conditions, the camera 20 may update the values of the table 26 in an iterative calibration process to optimize the values for the particular conditions and components being used in the camera 20. Thus, in a sense, the values of the table are self-adjusting to accommodate the non-ideal effects that are introduced by the camera 20 and to accommodate the use of different sizes and types of components in the camera 20. In this manner, the camera 20 may initialize the table 26 with a set of values in an attempt to sufficiently compensate the raw pixel data that originates with the image sensor 22. The camera 20 may then analyze the image that is indicated by the transformed pixel data, determine if the white color balance of the indicated image is acceptable, and if not, change the values in the table 26 to improve the quality of the next image that is produced by the camera 20.

The camera 20 captures and processes a particular optical image 18 in the following manner. The lens 23 and possibly other optics focus the optical image 18 onto the image sensor 22, and in response, the image sensor 22 furnishes signals that indicate the intensities of pixels of the captured image, i.e., indicates the raw data. If the image sensor 22 does not provide the red, green and blue (RGB) colors for each pixel location, then a color synthesis circuit 24 of the camera 20 may be used to interpolate the missing colors for each pixel location. For example, the image sensor 22 may provide pixel data from which a Bayer pattern (for example) color synthesis may be used to interpolate the missing RGB colors for each pixel location to form three intensity values (for the three colors) for each pixel location.

The resultant raw pixel data that is provided by the color synthesis circuit 24 (or image sensor 22, if the image sensor 22 provides true color pixel data) serves as indexes to point to the appropriate data in the table 26. The transformed data that is provided by the table 26 may then be processed by a color correction circuit 30 that transforms the pixel data so that the red, green and blue spectral responses of the indicated image match the corresponding spectral responses of the human eye. After this transformation, a color space conversion circuit 32 may convert the pixel intensities into a standard color space, such as a YCbCr color space, for example. From the data that is provided by the color space conversion circuit 32, a white color balance circuit 28 computes the white color balance of the image.

In some embodiments, if the computed white color balance is outside of a predetermined range, then the white color balance circuit 28 changes the values in the table 26, and the camera 20 passes the captured frame through the above-described transformations again. In this manner, after determining that a particular image has an unacceptable white color balance, the white color balance circuit 28 may multiply the values of each group 40, 42 and 44 (see FIG. 3) of the table 26 by associated scalars $\alpha_R$, $\alpha_G$, and $\alpha_B$, and subsequently, the new values in the table 26 may be used in the next set of transformations.

Thus, in some embodiments, the circuitry of the camera 20 forms a feedback loop that may be used in an iterative process to compensate for the white color balance, as the camera 20 permits processing of the image to account for other camera-introduced non-ideal effects before attempting to modify the values of the table 26 to readjust the white color balance. In some embodiments, when the camera 20 is in a still capture mode, the camera 20 may process the still image in the above-described feedback loop to adjust the values in the table 26 until the white color balance is acceptable. In other embodiments, the camera 20 may use a predetermined number (two, for example) of passes through the feedback loop. Thereafter, as long as the camera 20 is turned on, the camera 20 may periodically check (every ten frames, for example) the white color balance to determine if the white color balance is in a predetermined range, as the lighting conditions (one of the main variable) may remain substantially the same over a small number of frames.

For video, in some embodiments, the camera 20 may permit each frame to pass through even if the white balance is unacceptable, as the camera 20 may make corrections to each successive future frame until the white color balance is properly adjusted. Once adjusted, the camera 20 may periodically check the white color balance (via the white color balance circuit 20) during selected frames of the video.

Among the other features of the camera 20, in a bypass mode, the camera 20 may include a bypass path 39 for communicating the raw pixel data directly from the image sensor 22 to a computer 290. An edge enhancement circuit 34 may receive pixel data for an outgoing frame from the color space conversion circuit 32 and modify the data to further emphasize edges of the image to improve the image's contrast. A compression circuit 36 may compress the pixel data that is provided by the edge enhancement circuit 34 to reduce the bandwidth used to communicate a particular frame to the computer 290. Instead of communicating the frame to the computer 290, the frame may be stored (at least temporarily) in a memory 37.

Figure 4:
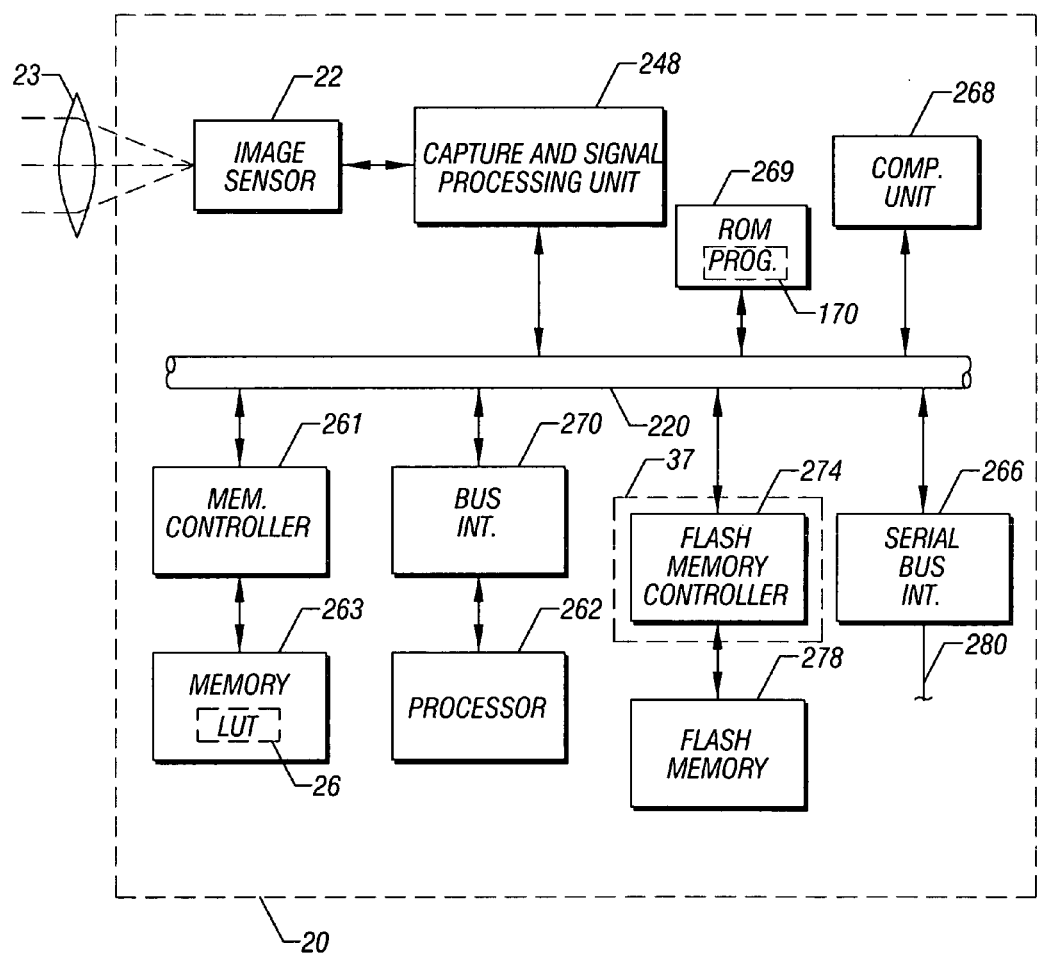
FIG. 4 is a more detailed schematic diagram of the camera of FIG. 2 according to an embodiment of the invention.

Referring to FIG. 4, as a more specific example, the camera 210 may include a capture and signal processing unit 248 that may interact with the image sensor 22 to capture the optical image and transfer a frame of data that indicates the resultant raw pixel data to a random access memory (RAM) 263. To accomplish this, the capture and signal processing unit 248 may be coupled to a bus 220, along with a memory controller 261 that receives the frame from the bus 220 and generates signals to store the data in the RAM 263. Indications of the look-up table 26 may also reside in the RAM 263. A processor 262 may access the data in the RAM 263 to perform, for example, the color synthesis, look-up table transformation, color correction, color space conversion, white color balance computation, and edge enhancement functions. The processor 262 may be coupled to the bus 220 via a bus interface 270. In this context, the term "processor" may generally refer to one or more microprocessors, such as a microcontroller, an X86 microprocessor, an Advanced RISC Machine (ARM) microprocessor or a Pentium® microprocessor, as just a few examples.

Among its other features, the camera 20, the camera 20 may include a compression unit 268 that may interact with the RAM 263 to compress the size of the processed frame before storing the compressed frame in the memory 37, such as a flash memory 278. To accomplish this, the compression unit 268 may be coupled to the bus 220, along with a flash memory controller 274 that receives the compressed frame from the bus 220 and generates signals to store the data in the flash memory 278. To transfer the compressed frame to the computer 290, the camera 20 may include a serial bus interface 266 that is coupled to the bus 220 to retrieve the compressed frame from either the RAM 263 or the flash memory 278. The serial bus interface 266 may generate signals on a serial bus 280 (a Universal Serial Bus (USB), for example) to transfer an indication of the compressed frame to the computer 290. The USB is described in detail in the Universal Serial Bus Specification, Revision 1.0, published on Jan. 15, 1996, and is available on the Internet at www.intel.com. The camera 20 may also include a read-only memory (ROM) 269 that may be coupled to the bus 220. The ROM 269 may store program 170 that causes the processor 262 to perform the above-described functions when the processor 262 executes the program 170.

Figure 5:
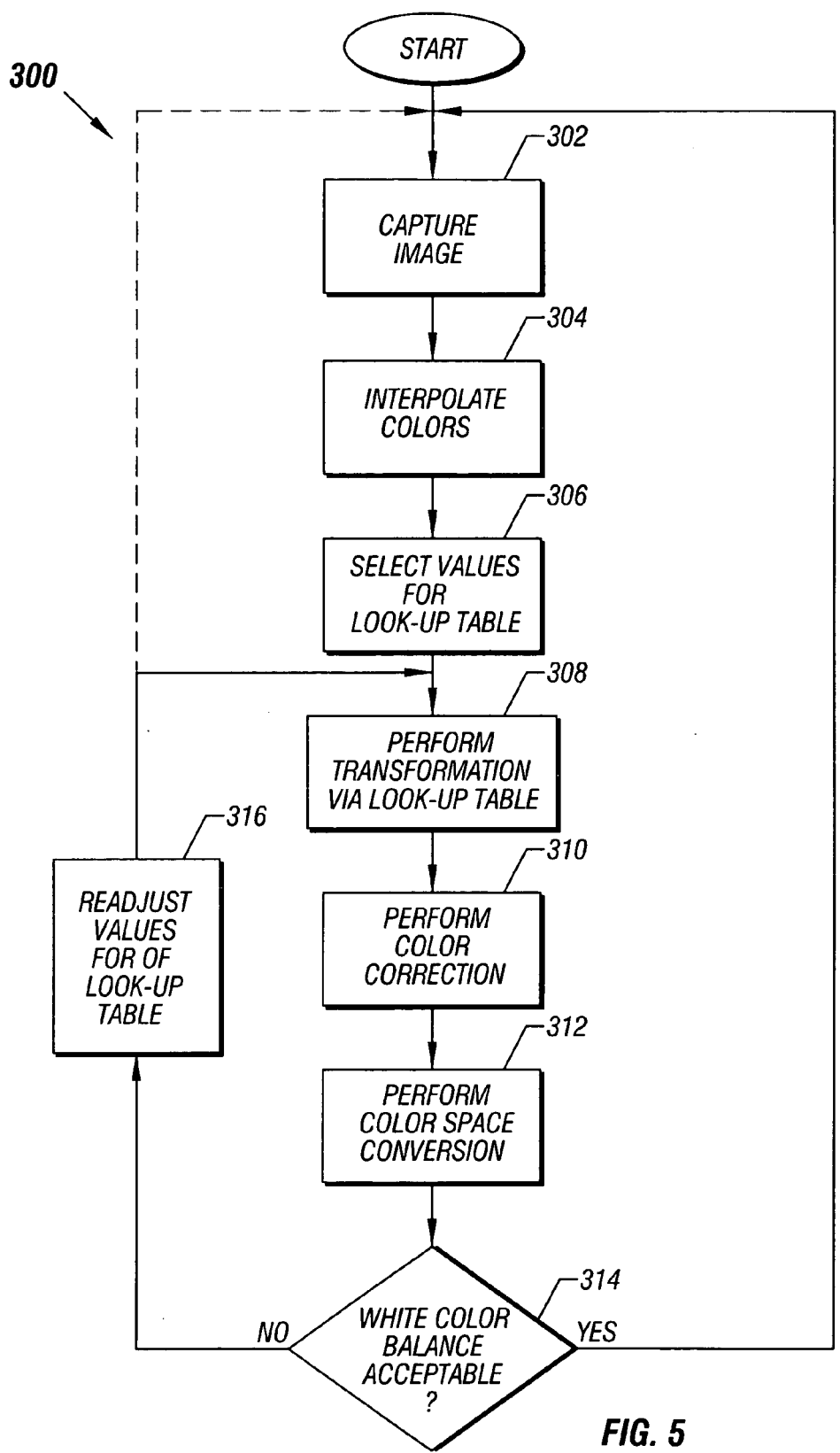
FIG. 5 is a flow diagram illustrating the processing that is performed by the camera according to an embodiment of the invention.

To summarize, the camera 20 may use the following technique 300 (depicted in FIG. 5) to process an optical image captured by the camera 20. In particular, the camera 20 may capture (block 302) an optical image, interpolate (block 304) any missing pixel colors from the captured image, select (block 306) values for the look-up table 26 and then perform an interactive process to adjust the values in the look-up table 26. In this manner, the camera 20 may perform (block 308) a transformation on the raw pixel data via the look-up table 26 and then perform (block 310) color correction. Next, the camera 20 performs (block 312) color space conversion before determining (diamond 314) whether the white color balance is acceptable. If not, the camera 20 then readjusts (block 316) the values in the look-up table 26 and then returns either to block 308 or alternatively to block 302, depending on the particular embodiment. If the camera 20 determines that the white color balance is acceptable, then the camera 20 returns to the block 302 to capture another optical image.

Other embodiments are within the scope of the following claims. For example, although a camera is described as an image processing circuit in accordance with the invention, other image processing circuits (a scanner, for example) may embody the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   capturing an optical image to form raw data indicative of the optical image;
   using values in a look-up table to transform the raw data into transformed data indicative of a second image;
   computing a white color balance of the second image; and
   modifying the values in the look-up table based on the computed white color balance and the values.

2. The method of claim 1, further comprising repeating the using, computing and modifying until the computed white color balance is at an acceptable level.

3. The method of claim 1, further comprising repeating the using, computing and modifying for a predetermined number of iterations.

4. The method of claim 3, wherein the number of iterations depends on whether the capturing is used to capture a still image or video.

5. The method of claim 1, further comprising:
   modifying the transformed data to compensate for differences in responses to the optical image between the image sensor and a human eye.

6. The method of claim 5, further comprising:
   modifying the result of the modification of the transformed data to convert the result into a predetermined color space.

7. The method of claim 1, further comprising:
   before the transformation, modifying the raw data to interpolate pixel colors.

8. An image processing circuit comprising:
   an image sensor to capture an optical image to form raw data indicative of the optical image;
   a look-up table storing values to transform the raw data into transformed data indicative of a second image;
   a white color balance circuit to compute a white color balance of the second image; and
   a second circuit to modify the values in the look-up table based on the computed white color balance and the values.

9. The image processing circuit of claim 8, wherein, for a single capture by the image sensor, the second circuit repeatably modifies the values in the look-up table and uses the white color balance circuit to compute the white color balance until the computed white color balance is at an acceptable level.

10. The image processing circuit of claim 8, wherein, for a single capture by the image sensor, the second circuit repeatably modifies the values in the look-up table and uses the white color balance circuit to compute the white color balance for a predetermined number of iterations.

11. The image processing circuit of claim 8, wherein the number of iterations depends on whether the capturing is used to capture a still image or video.

12. The image processing circuit of claim 8, further comprising:
   a color correction circuit to modify the transformed data to compensate for differences in responses to the optical image between the image sensor and a human eye.

13. The image processing circuit of claim 8, further comprising:
   a color space conversion circuit to convert the transformed data into a predetermined color space.

14. The image processing circuit of claim 8, further comprising:
   an interpolation circuit to modify the raw data to interpolate pixel colors.

15. The image processing circuit of claim 8, wherein the image processing circuit comprises a camera.

16. An article comprising a storage medium readable by a processor-based system, the medium storing instructions to cause a processor to:
   use values stored in a look-up table to transform raw data provided by an image sensor into transformed data that indicates an image,
   compute a white color balance of the image, and
   modify the values in the look-up table based on the computed white color balance and the values.

17. The article of claim 16, the instructions causing the processor to repeatably modify the values in the look-up table and compute the white color balance until the computed white color balance is at an acceptable level.

18. The article of claim 16, the instructions causing the processor to repeatably modify the values in the look-up table and computer the white color balance for a predetermined number of iterations.

* * * * *